United States Patent
Bartels

[15] 3,670,921
[45] June 20, 1972

[54] STRESS RELIEVED CONTAINER AND METHOD OF MAKING SAME

[72] Inventor: Herbert D. Bartels, Palos Heights, Ill.

[73] Assignee: Continental Can Company, Inc., New York, N.Y.

[22] Filed: Jan. 12, 1970

[21] Appl. No.: 2,304

[52] U.S. Cl. ............................................220/75, 138/109
[51] Int. Cl. ..............................................B65d 7/34
[58] Field of Search ..........................220/75, 67; 138/109

[56] References Cited

UNITED STATES PATENTS

| | | | |
|---|---|---|---|
| 1,643,252 | 9/1927 | McCrery | 220/75 X |
| 3,478,921 | 11/1969 | Bartels | 220/75 X |
| 3,179,284 | 4/1965 | Valyi | 220/75 |
| 2,120,038 | 6/1938 | O'Neil | 220/75 X |

Primary Examiner—M. Henson Wood, Jr.
Assistant Examiner—Thomas C. Culp, Jr.
Attorney—Diller, Brown, Ramik & Holt

[57] ABSTRACT

This disclosure relates to a metal container, and more particularly to a thin walled, metal can having a welded side seam and wherein at least one end thereof is necked-in and then outwardly flanged so as to receive an end of a reduced diameter. In order to prevent edge cracking during the flanging operation adjacent the welded seam, the necked-in edge of the can body is provided with a shallow notch on each side of the welded seam. In addition, in order to prevent wrinkling of the metal in alignment with the notches during the necking-in operation and subsequent fracture along the areas of wrinkling during flanging, the end edge portion of the blank from which the can body is formed is provided with stress relief indentations adjacent the notches.

14 Claims, 7 Drawing Figures

PATENTED JUN 20 1972 3,670,921

PRIOR ART

INVENTOR
HERBERT D. BARTELS

ATTORNEYS

STRESS RELIEVED CONTAINER AND METHOD OF MAKING SAME

This invention relates in general in new and useful improvements in the manufacture of welded, thin-walled metal cylinders, and more particularly to thin walled metal cans having welded side seams wherein one or more ends of the can bodies are necked-in prior to flanging.

It has been found in the past that when a thin-walled, metal cylinder is provided with a welded side seam of the overlapping bond type, in order to permit flanging without fracture of the metal adjacent to the side seam, it is necessary to provide the end edges of such metal cylinders with stress relief notches. The customary fractures are known as longitudinal flange cracks and are caused by circumferential tensile stress. Failure of the metal adjacent to the weld bond, which is inherently weakened by the welding process, is prevented by stress relief notches adjacent to the overlap of the side seam. The notches adjacent to the overlap reduce or minimize the circumferential, tensile stress between the notched locations and thereby permit the welded cylinder to be flanged without failure.

When the welded cylinder is a can body, at times prior to the flanging thereat, the ends are necked-in so as to receive ends of smaller diameter. The necking-in of the ends is done in a die forming operation which reduces the cylinder diameter at each end of the can body simultaneously. In the die forming operation, the metal is subjected to intensive circumferential, compressive stress around the circumference of the cylinder ends undergoing diameter reduction. The die forming tool relationship requires that sufficient clearance be allowed to accommodate the thicker section of the overlapped side seam and to prevent abrasion of protective coatings applied to the metal surfaces in prior operations.

In the die forming, diameter reducing operation, the circumferential, compressive stress causes failure to develop in the metal undergoing diameter reduction in the form of folds or wrinkles. The folds develop and are not removed or ironed out due to the aforementioned tool clearance. The die forming tooling is designed to permit the inner tool to float so that the greatest tool clearance is always generated in the area of the thicker overlapped bond in the welded cylinder. As a consequence, the folds or wrinkles are predisposed to occur adjacent to the overlapped bond. The welded side seam cylinder, which is provided with the stress relief notches, provides an additional problem in that the stress relief notches are of necessity located adjacent to the overlapped bond. The notched areas are then in the primary area in which compressive failure occurs and further, provide added probability for failure to occur, due to the increased discontinuity of the circumference by the presence of the notches.

The compressive failures identified as folds or wrinkles are not in themselves considered defects. However, when the cylinder or can body is flanged in the normal die flanging operation, the wrinkled area is subject to fracture to a larger degree than a non-wrinkled area. The probability of fracture is increased many times when the wrinkle is superimposed in the notch itself. This is due to the fact that the stress relief notch acts as a stress riser when subjected to the circumferential tensile stress and in performing its function as a tensile stress relief for the welded overlap, a stress concentration is developed within the notch.

In accordance with this invention, it is proposed to provide a compressive stress relief for the notched areas so that such wrinkling which may occur during the necking-in operation will not occur in axial alignment with the notched areas, but adjacent thereto. In this manner, such wrinkling which may occur during the necking-in operation will not occur in alignment with the notched areas, but adjacent thereto and thereby cracking in alignment with the notched areas has been eliminated.

In accordance with this invention, it is proposed to provide slight indentations adjacent to the notched areas such that both notches and the welded side seam lie in between the indentations. The indentations, which are formed by bending the metal from which the cylinder is formed, are in effect a preformed wrinkle. When the cylinder with the indentations is subjected to the usual circumferential compressive stress of die forming diameter reduction, the indentations develop immediately into failure in the form of folds or wrinkles. The indentations are predetermined failure points and yield to failure preferentially to a failure within the notched areas located between the indentations. By developing into failures under circumferential, compressive stress the indentations are effectively providing compressive stress relief for the metal in the immediate vicinity.

With the above and other objects in view that will hereinafter appear, the nature of the invention will be more clearly understood by reference to the following detailed description, the appended claims and the several views illustrated in the accompanying drawing.

Figure 1:
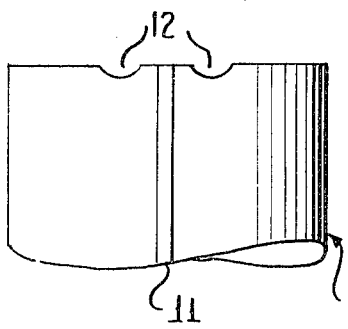
FIG. 1 is a fragmentary elevational view showing one end of a welded cylinder having stress relief notches on the opposite sides of the welded side seams thereof.
Figure 2:
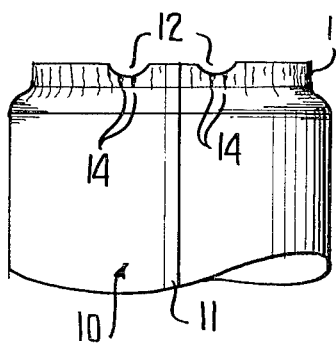
FIG. 2 is a fragmentary elevational view similar to FIG. 1 and shows the end of the metal cylinder necked-in with the subsequent folding or wrinkling of the metal in alignment with the stress relief notches.
Figure 3:
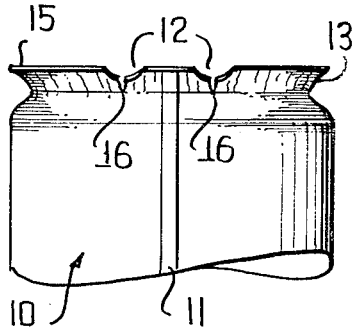
FIG. 3 is a fragmentary elevational view similar to FIG. 1 showing the necked-in cylinder after outward flanging thereof with the resultant cracking along the loosely formed wrinkles or folds in alignment with the stress relief notches.

Referring now to the drawing in detail, reference is first made to the prior art showings of FIGS. 1, 2 and 3. As previously described, there is illustrated in FIG. 1 a welded cylinder, which is generally identified by the numeral 10. The welded cylinder is formed of relatively thin sheet metal having a thickness preferably on the order of 0.008 inch and varying generally from 0.004 to 0.011 inch. The metal cylinder 10 is provided with a welded side seam 11 having an overlapping bond. The cylinder 10 is formed from a flat blank with the end edges thereof being provided with stress relief notches 12 adjacent the longitudinal edges thereof prior to the shaping thereof to the cylindrical form and the formation of the welded side seam 11.

Referring now to FIG. 2, it will be seen that the extreme end of the metal cylinder 10 has been necked-in in the manner previously described to provide an extreme end portion 13 of a reduced diameter. During the necking-in operation, there has been compressive failure of the metal of the extreme end portion with wrinkling or folding occurring in alignment with the stress relief notches 12 as at 14.

Referring now to FIG. 3, it will be seen that there is illustrated the metal cylinder 10 after an end flanging operation wherein the necked-in end portion 13 is provided with an outwardly directed circumferential flange 15 of the type normally required to facilitate the seaming of an end to the metal cylinder, preferably by means of a customary double-seaming operation. In the flanging operation, the necked-in end portion 13 is tensile stressed with the result that the stress relief notches 12 form stress rises in alignment with the previously formed wrinkles or folds 14 and tensile failure occurs in the form of cracks 16. The cracks 16 prevent the forming of a sealed seam between the metal cylinder or container body in a conventional container end (not shown).

Figure 4:
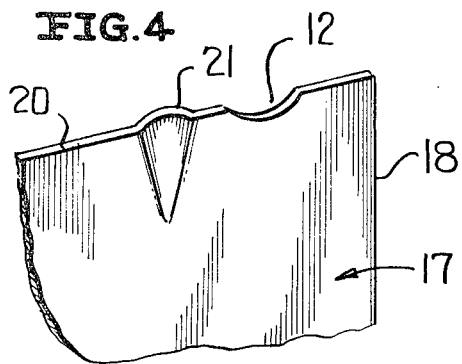
FIG. 4 is an enlarged fragmentary perspective view of one corner portion of a blank from which the metal cylinder is formed, the blank being provided with a stress relief indentation in the edge portion thereof immediately adjacent to the stress relief notch.

Referring now to FIG. 4 in particular, it will be seen that there is illustrated a portion of a blank 17 from which a metal cylinder or container body, such as the cylinder 10, may be formed. The blank 17 is generally rectangular in outline and includes a longitudinal edge 18 and an end edge 20. The blank 17 is provided with a stress relief notch 12 in the end edge 20 thereof adjacent each of the longitudinal edges 18 in the manner previously described.

In accordance with this invention, the blank 17 is also provided with a stress relief indentation 21. The stress relief indentation 21 is formed by bending or creasing the metal of the blank 17 immediately adjacent to the respective stress relief notch so as to effectively form a pre-formed wrinkle or fold. It is to be noted that the stress relief indentation 21 is preferably located at a distance of approximately one-eighth inch from the nearest portion of the associated stress relief notch 12 and has a depth of approximately 0.020 inch or less with a span of approximately one-eighth inch.

Figure 5:
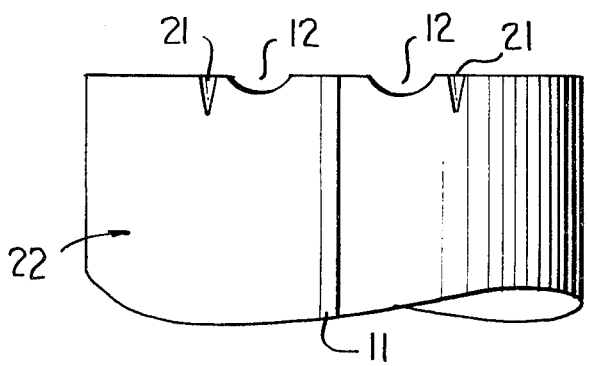
FIG. 5 is a fragmentary elevational view similar to FIG. 1 of a welded side seam cylinder formed with the blank of FIG. 4.

Reference is now made to FIG. 5 wherein there is illustrated a cylinder 22 which is formed from the blank 17 in the same manner as was the cylinder 10. The cylinder 22 is provided with the customary overlapped bond welded side seam 11 at each end thereof which is to be subsequently necked-in in the manner illustrated in FIG. 2 is provided with the stress relief notches 12 on opposite sides of the side seam 11. In addition, adjacent each of the stress relief notches 12 there is one of the stress relief indentations 21, the stress relief notches 12 and the welded side seam 11 lying between the stress relief indentations 21.

Figure 6:
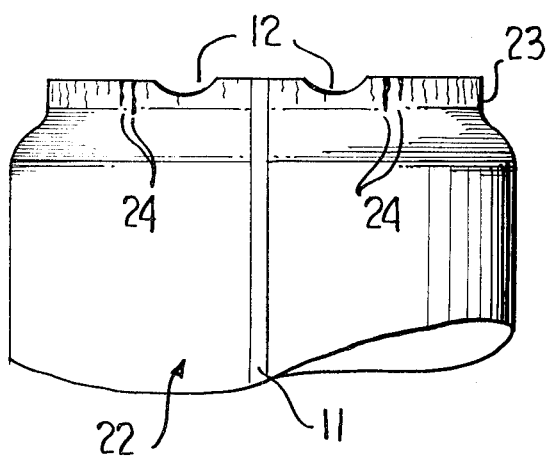
FIG. 6 is a fragmentary elevational view similar to FIG. 2 and shows the cylinder of FIG. 5 after the necking-in operation.

Referring next to FIG. 6, it will be seen that the cylinder 22 has had a necking-in operation performed on the illustrated end thereof to define a necked-in end portion 23 in the manner previously described with respect to FIG. 2. During the necking-in operation, there has been controlled failure of the end portion 23 in the form of folds or wrinkles 24. However, due to the formation of the stress relief indentations 21, the wrinkles or folds 24 are formed outside of the area of the stress relief notches 12. As previously indicated, the stress relief indentations 21 are disposed approximately one-eighth inch from the stress relief notches 12. The location of the stress relief indentations is preferably close to the stress relief notches for maximum effect, but sufficiently removed therefrom to prevent the intended indentation failure to encompass the stress relief notches.

Figure 7:
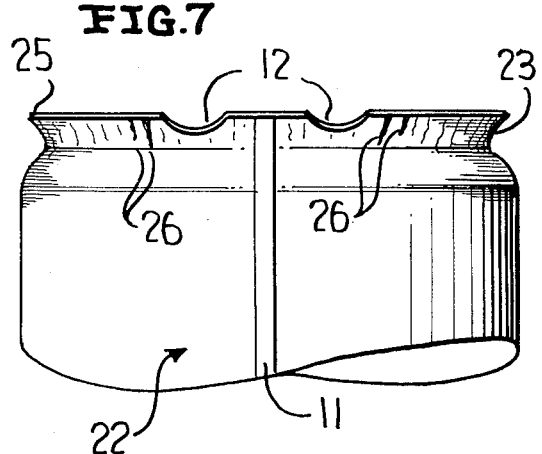
FIG. 7 is a fragmentary elevational view similar to FIG. 3 and shows the cylinder of FIG. 6 after a subsequent flanging operation.

Referring now to FIG. 7 in particular, it will be seen that the metal cylinder 22 has had a circumferential flanging operation performed on the necked-in end portion 23 thereof so as to define a circumferential flange 25 for the purpose of securing to the end of the cylinder 22 a conventional end closure, as described with respect to FIG. 3. During this flanging operation, the necked-in end portion 23 is tensile stressed with the result that the previously formed folds or wrinkles 24 in the area of the stress relief indentations 21 now appear as minor residual wrinkles 26 which in no way affect the satisfactory seaming of a conventional end closure to the cylinder 22. It is to be noted that no flange cracking has occurred during the flanging operation.

Although it was the initial concept of this invention to prevent flange cracking in the manner discussed hereinabove, it has been found that the provision of the stress relief indentations 21, which form the folds or wrinkles 24 during the necking-in operation, also function to relieve compressive shear stresses in the bond of the side seam. While the relieving or partial relieving of the compressive shear stresses in the bond of the side seam is advantageous where the bond is a welded bond, it has been found that this relieving of compressive shear stresses is particularly advantageous in tubular bodies wherein the side seam is of the type having a cemented or soldered bond.

In view of the foregoing, although the invention has been specifically described and illustrated in relation to a tubular body having a welded side seam and wherein at least one end edge thereof is notched on opposite sides of the side seam to prevent crashing during a flanging operation, the invention is not so limited, and may be utilized in conjunction with tubular bodies having bonded side seams wherein at least one end of a tubular body is to be necked-in and wherein compressive shear stresses resulting from the necking-in operation may unduly weaken or rupture the bonded side seam. A stated above, the bond of the side seam may be a welded bond, a cemented bond or a soldered bond.

At this time, it is pointed out that although reference has been generally made to a metal cylinder and in some instances to a metal container, the invention is particularly adaptable to the manufacture of can bodies of all sizes, including can bodies having a diameter under three inches such as normally utilized in the packaging of beer and soft drinks.

It is also pointed out that although the illustrated configuration of the stress relief indentation is that of a generally conical outline, the invention is not restricted to this specific outline. Although a preferred embodiment of the invention has been specifically illustrated and described herein it is to be understood that minor variations may be made in the shape, size and location of the stress relief indentations without departing from the spirit and scope of the invention, as defined by the appended claims.

I claim:

1. A tubular body having a welded side seam, at least one end of said can body having formed in the respective end edge thereof a stress relief notch on each side of said side seam, and stress relief means formed in said end edge portion on each side of said seam and adjacent a respective one of said stress relief notches.

2. The body of claim 1 wherein said stress relief means is in the form of a shallow indentation opening through the end edge.

3. The body of claim 1 wherein said stress relief means is in the form of a shallow indentation opening through the end edge, said indentation being tapered and of a maximum width and depth at said end edge.

4. The body of claim 1 wherein said stress relief means is in the form of a shallow indentation opening through the end edge, said indentation being tapered and of a maximum width and depth at said end edge, said depth being on the order of 0.020 inch.

The body of claim 1 wherein each said stress relief means is disposed on the side of a respective one of said stress relief notches remote from said side seam.

6. The body of claim 1 wherein each said stress relief means is disposed on the side of a respective one of said stress relief notches remote from said side seam and is spaced therefrom on the order of one-eighth inch.

7. The body of claim 1 wherein said one end is necked-in and said stress relief means is in the form of a controlled wrinkle.

8. The body of claim 1 wherein said body in a container body, said one end is necked-in and flanged, and said stress relief means is in the form of a minor residual wrinkle.

9. The can body of claim 1 wherein said can body is formed from a blank and said blank contains said stress relief means.

10. A tubular body having a bonded overlapping side seam of which one end is necked-in under compression, said tubular body one end having stress relief means on each side of said side seam partially absorbing compressive shear stresses in said side seam, said stress relief means being in the form of controlled wrinkles.

11. The tubular body of claim 10 wherein said controlled wrinkles open through an end edge of the tubular body.

12. The tubular body of claim 10 wherein said controlled wrinkles open through an end edge of the tubular body with each wrinkle resulting from a shallow indentation formed in said tubular body one end prior to the necking-in of said tubular body one end.

13. The tubular body of claim 12 wherein said tubular body is formed from a blank and said blank contains said indentations.

14. The tubular body of claim 12 wherein said necked-in end is outwardly flanged for the securement of an end member to said tubular body and said indentations are in the form of minor residual wrinkles in said flange.

* * * * *